Oct. 15, 1935.   G. C. E. KEET   2,017,598
MEANS FOR REDUCING AND GRADING ORES
Filed Dec. 29, 1933   2 Sheets-Sheet 1

Witness:
Arthur Thompson

Inventor:
Gabriel Christiaan Erasmus Keet

Oct. 15, 1935.  G. C. E. KEET  2,017,598

MEANS FOR REDUCING AND GRADING ORES

Filed Dec. 29, 1933  2 Sheets-Sheet 2

Witness:
Arthur Thompson

Inventor:
Gabriel Christiaan Erasmus Keet

Patented Oct. 15, 1935

2,017,598

UNITED STATES PATENT OFFICE 2,017,598

MEANS FOR REDUCING AND GRADING ORES

Gabriel Christiaan Erasmus Keet, Johannesburg, Transvaal Province, Union of South Africa Application December 29, 1933, Serial No. 704,506
In Union of South Africa July 26, 1933

3 Claims. (Cl. 83—10)

This invention has reference to a means, mill or machine primarily designed for reducing, comminuting or pulverizing, and in some cases classifying, grading or concentrating ore, although the mill or machine may advantageously be employed for similarly treating other minerals or materials.

The object with which the present invention has been designed is to construct a means, mill or machine suitable for reducing ores and other minerals or hard materials expeditiously and efficiently, and also, if desired, classifying, grading or concentrating the reduced material or product.

The mill or machine is adapted for reducing the ore or other material either in water or in a dry state or condition.

The mill or machine includes an external vessel or pan of appropriate internal shape, which is rotated at a suitable high rate of speed, and an internal element adapted to rotate about a centre which is eccentric to the axis or centre line of rotation of the external vessel or pan, and to be rotated by the latter through the medium of the material being acted upon between the opposing co-operating crushing surfaces of the said pan or vessel and element.

The invention will be more fully explained with the aid of the accompanying drawings, wherein Fig. 1 is a half-sectional elevation of the mill or machine.

Figure 1:
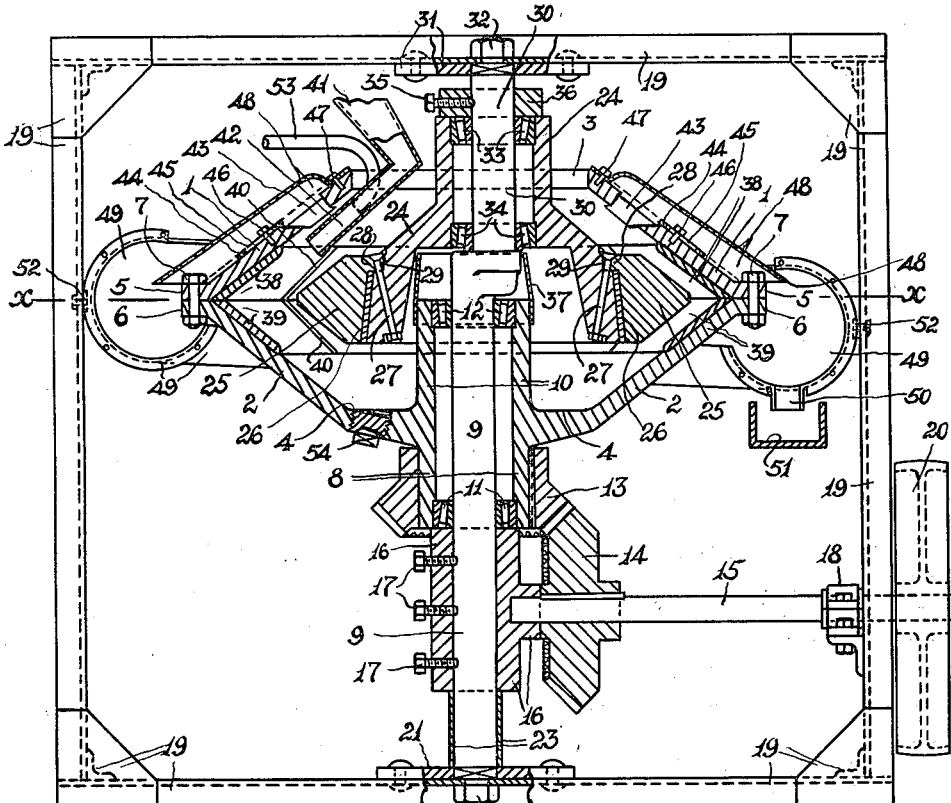
Figure 2:
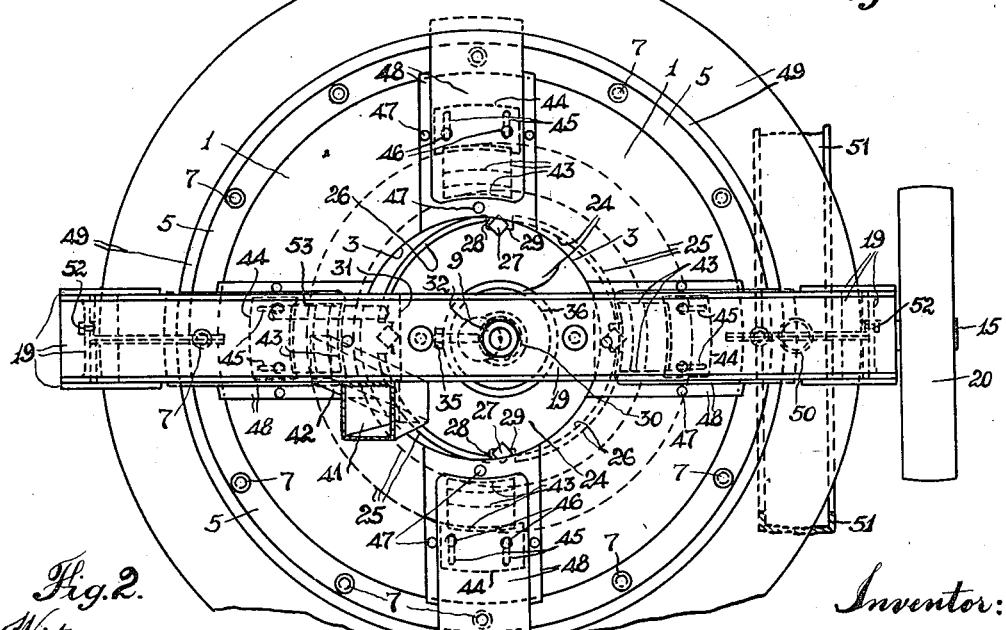
Fig. 2 is a plan view of the same.
Figure 3:
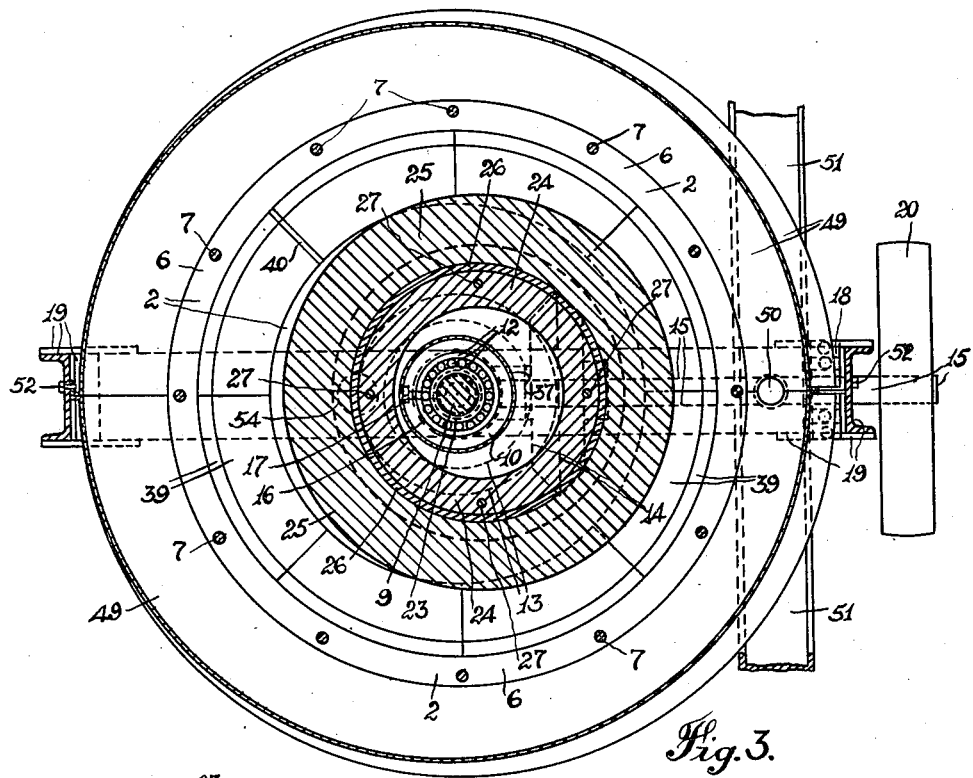
Fig. 3 is a sectional plan on line $x$—$x$ in Fig. 1.

In the embodiment of the invention illustrated in Figs. 1 to 3 of the drawings, the vessel or pan is in the form of two truncated shallow cones 1, 2, placed base to base. The truncated end of the upper cone 1 is left open, as indicated at 3, and the truncated bottom end of the lower cone 2 is closed, as indicated at 4, and constitutes the bottom of the vessel or pan. The parts 1, 2, are shown constructed with external flanges 5, 6, respectively, by means of which they are connected together by the bolts 7.

For the purpose of driving or rotating the vessel or pan it is shown constructed centrally at the bottom with a hollow boss 8, by means of which it is rotatably mounted on a stationary vertical shaft 9. The lower cone 2 is constructed interiorly with a further hollow boss 10, and in the lower end of the boss 8 and upper end of the boss 10 taper roller bearings 11, 12, are arranged around the shaft 9.

The means for driving the pan or vessel, as shown, include a bevel toothed wheel 13 fixed to the boss 8 below the bottom 4 of the pan or vessel, and a bevel toothed driving wheel 14 meshing therewith. The wheel 14 is keyed on a shaft 15 which is rotatably supported at its inner end in a sleeve member 16, fixed by set-screws 17 to the shaft 9 beneath the boss 8. The shaft 15 runs in a further bearing 18 carried by the framework 19; 20 being a driving pulley fixed on the outer end of the shaft 15.

The stationary vertical shaft 9, at its lower end, is shown non-rotatably carried and supported by a plate 21 fixed to the framework 19; 22 being a retaining nut on the lower screwed end of the shaft 9. 23 is a sleeve which serves as a distance piece between the lower end of the member 16 and the plate 21.

The internal element comprises two parts, namely a hub or centre portion 24 and a surrounding crushing ring 25, which latter is made of substantially the same shape exteriorly as that portion of the interior of the vessel or pan with which it co-operates to effect the reduction of the material. The element 24, 25, is somewhat smaller in diameter than the interior of the pan or vessel. Between the ring 25 and the hub portion 24 around which it is placed, packing material 26 of wood or other suitable material is inserted, and the ring 25 is secured in position by the bolts 27. The ring 25 is constructed at the top with lugs or projections 28, which engage in correspondingly shaped recesses 29 in the hub 24. The heads of the bolts 27, as shown, may be countersunk in the lugs or projections 28. The lugs 28, by engaging in the recesses 29, prevent rotation of the ring 25 around the hub 24.

The hub or centre portion 24 of the internal element is rotatably mounted on a vertical shaft 30, which is shown constructed integral with the shaft 9 and eccentric thereto. The upper end of the shaft 30 is non-rotatably carried by a plate 31 fixed to the framework 19; 32 being a fixing nut on the upper screwthreaded end of the shaft 30. Between the hub or centre portion 24 and the shaft 30 top and bottom taper roller bearings 33, 34, are arranged, on which the internal element is free to rotate. On the shaft 30, above the upper end of the hub 24 is secured by setscrew 35 a collar 36 which functions to prevent the internal element rising on the shaft 30, so keeping it in its correct operative position in the vessel or pan.

By rotatably mounting the internal element around the eccentric portion 30 of the stationary shaft 9, 30, the rotational movement of the internal element is eccentric to the axis of rotation of the vessel or pan around the lower portion 9 of the shaft 9, 30.

Around the upper portion of the internal boss 10 of the pan or vessel a cylindro-conical ring 37 is secured, which extends to a point immediately beneath the bottom roller bearing 34 and serves to prevent the access of any of the material being treated to the bearings 12, 11.

The material under treatment will, as a result of the centrifugal action on the material and the crushing action of the internal element, form a bed or lining, and protect the walls of the vessel or pan against excessive attrition. In the drawings the pan or vessel is shown provided with segmental conical metal lining plates 38, 39, with which the crushing ring 25 co-operates. The lining plates 38, 39, are secured in position by wedges 40 driven in the joints between adjacent ends of two of the sections of each set of plates 38, 39.

The material which is to be reduced is, in the embodiment shown, introduced into the mill through the medium of a stationary hopper 41 and chute 42, the latter extending into the space formed between the lining of the internal wall of the vessel or pan and the opposing surface of the internal element.

The withdrawal or removal of the reduced product from the upper portion of the vessel or pan is effected by providing openings 43 in the top or upper conical section 1 of the vessel or pan. Plates 44 are adjustably secured to the outside of the upper section 1 by providing them with slots 45 in which engage the fixing setscrews 46. The plates 44 can be adjusted over the openings 43 to regulate the level of the outflow of the reduced or comminuted product from the vessel or pan in order to vary the degree of comminution or fineness of the outflowing product. Over each of the openings 43 there is arranged, and secured by set-screws 47, a hood or cover 48, which serves to deflect and to discharge the product into a stationary annular receptacle or casing 49. The receptacle 49 is open on the inner side to allow the lower ends of the covers 48 to project into it for a short distance. It is constructed in two flanged sections bolted together, and is shown provided with a discharge spout 50 for delivering the product into a launder 51 for conveying it to any desired point. The receiving vessel 49 is secured to the framework 19 at 52, and is downwardly inclined in the direction of the discharge spout 50 so that the product flows to the outlet by gravity.

53 is a fixed pipe for introducing the water or other liquid into the pan or vessel.

54 is a plug screwed into an opening provided in the bottom 4 of the pan or vessel, which opening allows of the contents of the pan or vessel being removed after the machine has been stopped. By this means the removal of any of the classified or graded product, or concentrates from the pan or vessel can be effected.

In the operation of the embodiment of the invention illustrated in Figs. 1 to 3 of the drawings, the pan or vessel is rotated at a suitable high rate of speed, and the material which is to be reduced admitted in regulated quantity through the hopper 41 and chute 42, and the water supply through pipe 53 turned on. Due to the centrifugal action set up by the rotation of the pan or vessel, the ore or other material is thrown into the space between the lining plates 38, 39. The accumulation of such material between the opposing surfaces of the lining plates 38, 39, and the internal rotating co-operating crushing element 24, 25, causes the latter to be rotated inside the pan or vessel 1, 2, producing a crushing action on such material due to the eccentric arrangement of the internal element 24, 25, inside the pan or vessel. As the material is reduced the inflowing water carries the same to and through the outlets 43, into the hoods or covers 48, by which it is deflected to the receptacle 49, and passes from the latter through the spout 50 into the launder 51.

Figure 4:
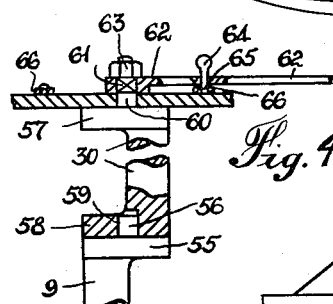
Fig. 4 is a detail part-sectional elevation illustrating means for varying the eccentricity of the axis of the internal element relative to the axis of the vessel or pan.
Figure 5:
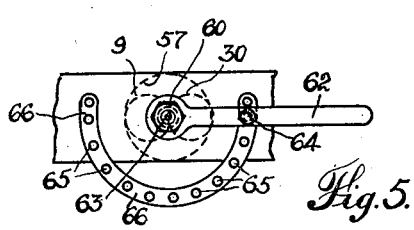
Fig. 5 is a plan view of Fig. 4.

In Figs. 4 and 5 means are illustrated for altering or varying the eccentricity of the portion 30 of the stationary shaft relative to the portion 9 thereof. In this construction the upper portion of the shaft 9 is constructed with an eccentric enlargement 55, on the top of which is provided a pin or projection 56. The upper portion 30 of the stationary shaft is fashioned with eccentric top and bottom enlargements 57, 58. In the enlargement 58 is formed a hole or recess 59 in which the pin or projection 56 fits. This allows the upper portion 30 of the shaft to be moved about the pin 56. On the top of the enlargement 57 is formed a projection 60, a portion 61 of which is made of square shape to receive an operating lever 62. The lever 62 is secured in position by a nut 63 screwed on the reduced upper portion of the projection 60. The lever is provided with a pin 64 which is adapted to be placed in engagement with any one of a number of holes 65 in a semi-circular plate 66 in order to effect the required adjustment of the degree or extent of eccentricity of the shaft 30 relative to the shaft 9. This permits the eccentricity of the internal element relative to the pan or vessel to be varied between the limits of adjustment.

Figure 6:
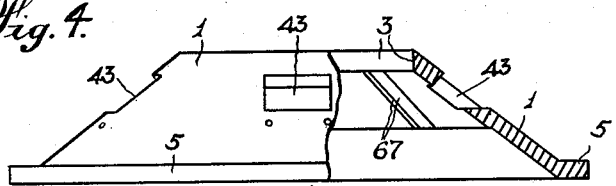
Fig. 6 is a part-sectional elevation of the upper portion of the pan or vessel, illustrating the provision of means for facilitating the discharge of the reduced product in dry grinding.

In Fig. 6 I illustrate the upper portion of the pan or vessel constructed for effecting the reduction of the ore or other material in a dry state. For this purpose the part 1 is constructed interiorly intermediate the openings 43 with vanes, ribs or webs 67 which will operate on the comminuted material around the openings 43 to keep it in suspension and facilitate its discharge or removal.

What I claim as my invention and desire to protect by Letters Patent is:—

1. Means for reducing ores and other materials, including an external rotated vessel, a stationary shaft around which the vessel is arranged, means for rotating the vessel around said shaft at a high rate of speed, a crushing element arranged within said vessel, a further stationary shaft formed as an extension of the first mentioned shaft and eccentric thereto around which the internal crushing element is rotatably arranged, means for introducing the material to be treated into the vessel between the co-operating crushing surfaces of the vessel and internal element, means for introducing water into the vessel, a plurality of outlets in the upper portion of the wall of the vessel, means for regulating the height of the outflow of the product through said outlets, deflectors over said outlets, a receptacle for receiving the product from the deflectors, and a closable opening in the vessel for removing material retained in the vessel, as set forth.

2. Means for reducing ores and other materials, including a stationary vertical shaft having an eccentric portion, a vessel in the form of two truncated cones placed base to base which is rotatably arranged around the stationary shaft, means for rotating said vessel, an internal crushing element having a substantially V-shaped peripheral crushing surface and rotatably arranged around the eccentric portion of the stationary shaft, and rotated by frictional contact with the material under treatment in the vessel, and means for introducing into the vessel the material which is to be treated between the co-operating crushing surfaces of the vessel and internal element, the vessel being provided above the internal crushing element with an outlet for the reduced product, as set forth.

3. Means for reducing ores and other materials, including an external rotated vessel in the form of two truncated cones placed base to base and providing a V-shaped internal surface, a stationary shaft around which the vessel is arranged, means for rotating the vessel around said shaft at a high rate of speed, a crushing element arranged within the vessel and constructed externally of substantially V shape peripherally, a further stationary shaft formed as an extension of the first mentioned shaft and eccentric thereto, around which the internal element is rotatably arranged, means for introducing the material into the vessel to be treated between the co-operating crushing surfaces of the vessel and internal element, means for introducing fluid into the vessel, an outlet for the reduced product in the upper portion of the wall of the vessel, means for regulating the height of the outflow of the product through said outlet, a deflector co-operating with said outlet, and a receptacle for receiving the product from the deflector, as set forth.

GABRIEL CHRISTIAAN ERASMUS KEET.